United States Patent Office 2,861,982
Patented Nov. 25, 1958

2,861,982
POLYMERIZATION OF WATER-SOLUBLE UNSATURATED MONOMERS WITH HYDROGEN ATOMS

Guido Mino, Plainfield, N. J., assignor to American Cyanamid Company, New York, N. Y., a corporation of Maine No Drawing. Application April 13, 1956
Serial No. 577,938

9 Claims. (Cl. 260—80)

This invention relates broadly to the polymerization of water-soluble, unsaturated monomers and, more particularly, is concerned with a new and useful improvement in the polymerization of water-soluble, polar, ethylenically unsaturated, monomeric material. Still more particularly, the invention is concerned with a particular catalyst or initiator for accelerating the polymerization of such water-soluble, polar monomers.

The polymerization of ethylenically unsaturated compounds has achieved relatively great importance in recent years. Although the polymerization of many of such compounds can be effected in the absence of a polymerization catalyst or initiator, the more common practice has been to accelerate the polymerization reaction by the use of a polymerization catalyst or catalyst system. Such catalysts or catalyst systems have included components containing directly linked oxygen atoms such as benzoyl peroxide, potassium persulfate, ammonium persulfate and the like; azo catalysts such as alpha, alpha'-azodiisobutyronitrile; "redox" catalyst systems such as those comprised of ammonium persulfate and sodium bisulfate; and others.

In conventional polymerization reactions using ordinary catalysts such as those mentioned above, relatively high temperatures are usually required in order to obtain a high rate of conversion of the monomeric material to the polymer. In many cases the use of elevated temperatures leads to products of inferior qualities. The desirability of achieving an appreciable rate of polymerization at a lower temperature has been recognized by prior investigators; and in the polymerization of specific unsaturated materials such low-temperature polymerization reactions have resulted in products of superior quality and of substantial benefit to the particular industry. An example of the latter is in the production of synthetic rubbers having increased abrasion resistance by carrying out the polymerization of the monomeric mixture at a low temperature.

The production of polymers by a relatively low-temperature polymerization reaction is a matter of considerable importance with a large class of monomeric materials. It is especially true in the polymerization of water-soluble, polar, ethylenically unsaturated, monomeric materials such as acrylonitrile, methacrylonitrile, acrylamide, methacrylamide, acrylic acid, methacrylic acid, etc., and mixtures thereof in any proportions. The polymers and copolymers of many of these monomeric materials, e. g., polyacrylonitrile and copolymers of acrylonitrile with other unsaturated materials that are copolymerizable therewith, have found extensive use in recent years in the production of synthetic fibers. In the production of acrylonitrile polymers and copolymers for synthetic fiber use, it is important that the average molecular weight of the product be maintained within a relatively narrow range and also that the color of the polymer (and of the fiber made therefrom) be good both initially and after the polymer or fiber has been subjected to an elevated temperature for a prolonged period of time. Optimum results are generally obtained in the production of acrylonitrile polymers and copolymers having these desired molecular-weight and color-stability characteristics, other factors being constant, when the polymerization reaction is carried out at the lowest temperature consistent with optimum conversion of monomer to polymer at lowest processing costs.

The present invention has as its primary object an improved process of polymerizing water-soluble, polar, ethylenically unsaturated, monomeric material (that is, either a single monomer or a mixture of monomers in any proportions).

Another object of the invention is to provide an improved polymerization process of the kind described in the preceding paragraph and which can be carried out at a lower temperature than heretofore has been commonly used.

Still another object of the invention is to provide an improved process whereby water-soluble, polar, ethylenically unsaturated, monomeric material can be polymerized at a relatively low temperature to yield polymers, which in many cases (for example, in the case of polyacrylonitrile), have a higher degree of crystallinity than is usually obtained with the standard or conventional polymerization initiators or catalysts.

Other objects of the invention will be apparent to those skilled in the art from the following description and the illustrative examples.

The foregoing and other objects of the invention are accomplished, in general, by polymerizing a water-soluble, polar, ethylenically unsaturated, monomeric material, e. g., acrylonitrile, by bringing the same in contact, in aqueous solution, with hydrogen produced in situ by the action of a strong, non-oxidizing, inorganic acid, which is component of the said aqueous solution, on amalgamated zinc. Ordinarily, the polymer forms initially on the surfaces of the amalgamated zinc and then rises to the upper portion of the aqueous phase.

Taking acrylonitrile as illustrative of the water-soluble, ethylenically unsaturated, monomeric material which is to be polymerized in aqueous solution (or dispersion), it may be pointed out that this monomer can be polymerized with the aid of hydrogen produced by the reaction of a strong, non-oxidizing mineral acid, e. g., hydrochloric acid, in aqueous solution, on metallic zinc. By this particular polymerization techique, generation of hydrogen is usually very rapid and only a small amount of polymer is formed. I have surprisingly discovered that when amalgamated zinc is substituted for zinc metal as the material which is reacted with the aqueous mineral acid to produce hydrogen in situ, then the amount of hydrogen produced is greatly reduced and the yield of polymer is increased. Furthermore, the resulting polymer, at least in the case of polyacrylonitrile, appears to have a higher degree of crystallinity than polyacrylonitrile prepared with standard initiators.

The initiation is believed to proceed as follows:

Reaction 1: $Zn + 2H^+ \rightarrow Zn^{++} + 2H$
Reaction 2: $2H \rightarrow H_2$
Reaction 3: $H + monomer \rightarrow$ active center Reaction 2, which produces molecular hydrogen, and reaction 3, the initiation reaction, are competitive. When pure zinc is used, reaction 2 is very fast; consequently the number of hydrogen atoms available for the initiation step is very small. With amalgamated zinc, reaction 2 is very slow, because mercury has a high over-voltage, and the number of hydrogen atoms available for initiation is large. The high efficiency of the zinc amalgam, compared with the low efficiency of pure zinc metal, supports the above initiation scheme. Amalgamating the zinc is one advantageous and economical means of slowing reaction 2.

The composition of the zinc amalgam (amalgamated zinc) can be varied within wide limits without decreasing its effectiveness for its intended purpose. One suitable method of preparing the amalgamated zinc is as follows: 5 g. of zinc metal are suspended in 10 cc. of distilled water containing 0.2 g. of mercuric chloride and 0.5 ml. of concentrated hydrochloric acid. The suspension is stirred for 10 minutes at room temperature, decanted and washed with distilled water.

Zinc amalgams of various compositions can be prepared by varying the concentration of mercuric chloride in the above formula, e. g., between 0.01 and 2 g. All of these zinc amalgams are effective in polymerizing acrylonitrile and other water-soluble, polar, ethylenically unsaturated monomers at temperatures of about 35° C. and lower. The use of higher temperatures (e. g., up to the reflux temperature of the aqueous solution of monomer) is not precluded but ordinarily provides no particular advantages; and with certain monomers may even be undesirable for the reasons stated hereinbefore. Optimum rapidity of polymerization is obtained when the amalgamated zinc is finely ground (e. g., so that substantially all of it passes through a No. 100 sieve of the U. S. Standard Screen Scale), and is washed with concentrated hydrochloric acid or other suitable acid prior to use.

The hydrogen can be generated by the action of a dilute aqueous solution of any water-soluble, strong, non-oxidizing, inorganic acid on the amalgamated zinc. Preferably, hydrochloric acid or sulfuric acid is employed. Illustrative examples of other inorganic acids which are operative in generating the hydrogen are phosphoric acid, pyrophosphoric acid, hydrobromic acid, and hydroiodic acid. The water-soluble, strong, non-oxidizing, halogenated organic acids, for instance the more highly halogenated acetic acids (e. g., the di- and trichloroacetic acids, the di- and trifluoroacetic acids, etc.) are the equivalent, in practicing the present invention, of the water-soluble, strong, non-oxidizing, inorganic acids from an operative standpoint in producing the hydrogen, by the action of a dilute aqueous solution thereof, on amalgamated zinc.

The polymerization reaction is usually carried out at a temperature within the range of from about $-1°$ C. or $-2°$ C. to ordinary room temperature, which normally is about 20°–30° C. but sometimes may be as high as 35° C. or even higher. Temperatures below $-2°$ C. may be obtained and used (in case the acid alone is not sufficient to obviate solidification of the reaction mass at the desired, low, polymerization temperature) by adding a freezing-point depressant to the aqueous solution, for example, sodium chloride when the acid used is hydrochloric acid or sodium sulfate when the acid employed is sulfuric acid. The preferred temperature of polymerization is within the range of from about $+10°$ C. to about $+35°$ C.

The time of polymerization may be varied as desired or as conditions may require and will depend upon such variables as the temperature of polymerization, the concentration of monomer in the aqueous solution, the degree of conversion of monomer to polymer that is desired and other influencing factors; but generally the time is within the range of from ½ to 24 hours. Longer periods obviously can be used if desired.

The concentration of acid in the aqueous solution can be varied as desired or as may be required in order to cause hydrogen to be produced at the desired rate, taking into consideration the amount of zinc amalgam that is being acted on by the acid. Although it is not necessary to do so, the amalgamated zinc can be caused, if desired, to remain suspended (as by mechanical agitation and/or agitation with nitrogen or other inert gas) in the aqueous reaction mass.

The concentration of dissolved monomer, or of monomer which is both dissolved and dispersed, in the aqueous acidic reaction medium can be varied over a wide range. For example, the concentration of monomer can be varied from, for instance, about ½% by weight of the aqueous reaction medium (exclusive of the zinc amalgam) up to the maximum amount which is soluble therein at the particular reaction temperature. The lower percentage (mentioned by way of example as ½%) is governed only by practical considerations, and the process is operative with any percentage below the stated ½% monomer. An amount of monomer above that which will dissolve in the aqueous acidic reaction medium can be used, if desired, in which case the excess over that which dissolves is dispersed in the aqueous phase. The total monomer (that is, dissolved monomer or both dissolved and dispersed monomer) content of the reaction mass may constitute from, for example, about ½% to about 40% by weight of the total weight of acid, water and monomer.

The process can be carried out by batch or semi-continuous methods.

At the end of the reaction period the polymer is separated from the aqueous medium by any suitable means, e. g., by decantation, flotation, filtration, centrifuging, etc., or by any suitable combination of these and other methods. It is then washed to free it of contaminants including any unreacted monomeric material if the latter was not previously separated for re-use, e. g., by distillation. The unreacted zinc amalgam can be recovered and re-used in the process.

In order that those skilled in the art may better understand how the present invention can be carried into effect, the following examples are given by way of illustration and not by way of limitation. All parts and percentages are by weight.

Example 1

Twenty (20) g. of finely-divided (approximately 100 mesh) zinc amalgam, 7.76 g. of acrylonitrile, inhibitor free, 150 cc. of water and 10 cc. of concentrated hydrochloric acid are placed in a one-neck flask fitted with a safety valve. Polymerization starts after five minutes. The polymer is formed on the surface of the amalgam. After 4 hours at 30° C., 47.5% conversion is obtained. The polymer is suspended in chloroform, stirred vigorously and separated from the unreacted zinc amalgam by flotation. The isolated polymer is dissolved in dimethylformamide. X-ray examination of films, cast from the dimethylformamide solution, shows a certain degree of crystallinity.

Similar results are obtained when an equivalent amount of methacrylonitrile is substituted for acrylonitrile in the above process.

Example 2

Twenty (20) g. of amalgamated zinc of approximately 100-mesh fineness, 50 cc. of distilled water, 10 g. of acrylamide and 10 cc. of concentrated hydrochloric acid are placed in a flask fitted with a safety valve. The flask is cooled (about 10°–15° C.) with a water bath. After 1 hour the aqueous solution of the polymer is precipitated by adding an excess of acetone, separated by filtration and dried. The yield of dried polymer corresponds to a conversion of 35.1%.

Similar results are obtained when an equivalent amount of methacrylamide is substituted for acrylamide in the above process.

Example 3

Ten (10) parts of zinc amalgam of approximately 100-mesh fineness is suspended in 25 parts of water containing 5 parts of concentrated hydrochloric acid. When 5 parts of glacial methacrylic acid is added to the suspension, polymerization starts immediately at room temperature (20°–30° C.). After 2 hours at this temperature the polymer is isolated as in Example 1, and it is found that 52% of the monomeric methacrylic acid has been polymerized to polymeric methacrylic acid.

Similar results are obtained when an equivalent amount of acrylic acid is substituted for methacrylic acid in the above process.

It will be understood, of course, by those skilled in the art that my invention is not limited to the specific ingredients, specific temperatures and specific procedures given by way of illustration in the foregoing examples. Thus, instead of hydrochloric acid other strong, non-oxidizing, inorganic acids, or their equivalents, can be used in aqueous solution to generate hydrogen by its action on the amalgamated zinc, e. g., sulfuric acid. Likewise, other water-soluble, polar, ethylenically unsaturated monomers (or mixtures thereof in any proportion) other than those employed in the specific examples can be used. Examples of such monomers, in addition to those mentioned hereinbefore, are alpha-chloroacrylic acid, alpha-chloroacrylonitrile, methylene-bis-acrylamide, the various vinylpyridines (e. g., 2-vinylpyridine, 2-methyl-5-vinyl-pyridine, etc.) and others that will be obvious to those skilled in the art.

I claim:

1. In the polymerization of water-soluble, polar, ethylenically unsaturated, monomeric material selected from the class consisting of the vinylpyridines, alpha-chloroacrylic acid, alpha-chloroacrylonitrile, methylene-bis-acrylamide, acrylonitrile, methacrylonitrile, acrylamide, methacrylamide, acrylic acid, methacrylic acid, and mixtures thereof, the improvement wherein the said monomeric material is polymerized by bringing the same in contact, in aqueous solution, with hydrogen atoms produced in situ by the action of a strong, non-oxidizing, inorganic acid, which is a component of the said aqueous solution, on amalgamated zinc, said hydrogen atoms being the sole polymerization catalyst for the reaction.

2. The improvement as in claim 1 wherein the inorganic acid is sulfuric acid.

3. The improvement as in claim 1 wherein the inorganic acid is hydrochloric acid.

4. In the polymerization of acrylonitrile, the improvement wherein the monomeric material is polymerized by bringing the same in contact, in aqueous solution, with hydrogen atoms produced in situ by the action of a strong, non-oxidizing, inorganic acid, which is a component of the said aqueous solution, on amalgamated zinc, said hydrogen atoms being the sole polymerization catalyst for the reaction.

5. The improvement as in claim 4 wherein the inorganic acid is hydrochloric acid.

6. In the polymerization of acrylamide, the improvement wherein the monomeric material is polymerized by bringing the same in contact, in aqueous solution, with hydrogen atoms produced in situ by the action of a strong, non-oxidizing, inorganic acid, which is a component of the said aqueous solution, on amalgamated zinc, said hydrogen atoms being the sole polymerization catalyst for the reaction.

7. The improvement as in claim 6 wherein the inorganic acid is hydrochloric acid.

8. In the polymerization of methacrylic acid, the improvement wherein the monomeric material is polymerized by bringing the same in contact, in aqueous solution, with hydrogen atoms produced in situ by the action of a strong, non-oxidizing, inorganic acid, which is a component of the said aqueous solution, on amalgamated zinc, said hydrogen atoms being the sole polymerization catalyst for the reaction.

9. The improvement as in claim 8 wherein the inorganic acid is hydrochloric acid.

References Cited in the file of this patent

UNITED STATES PATENTS

| | | |
|---|---|---|
| 1,893,879 | Bennet et al. | Jan. 10, 1933 |
| 2,356,767 | Kropa | Aug. 29, 1944 |
| 2,473,005 | Britton | June 14, 1949 |
| 2,606,142 | Storch | Aug. 5, 1952 |
| 2,648,656 | Vandenburg | Aug. 11, 1953 |

OTHER REFERENCES

Burnett: "Mechanism of Polymer Reactions" (New York: Inter-science Publishers Inc., 1954), page 139 only needed. (Copy in Patent Office Science Library.)